US012567621B2

(12) United States Patent
Ma et al.

(10) Patent No.: US 12,567,621 B2
(45) Date of Patent: Mar. 3, 2026

(54) THERMAL SYSTEM

(71) Applicant: Rivian IP Holdings, LLC, Irvine, CA (US)

(72) Inventors: Ming Ma, Tustin, CA (US); Khaled Bahel-Eldin, Irvine, CA (US); Heng Kang, Los Angeles, CA (US); Xingyu Ren, Irvine, CA (US); Srivatsan Madhavan, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 691 days.

(21) Appl. No.: 17/739,343

(22) Filed: May 9, 2022

(65) Prior Publication Data

US 2023/0361384 A1     Nov. 9, 2023

(51) Int. Cl.
| | |
|---|---|
| *H01M 10/6568* | (2014.01) |
| *H01M 10/48* | (2006.01) |
| *H01M 10/613* | (2014.01) |
| *H01M 10/615* | (2014.01) |
| *H01M 10/625* | (2014.01) |
| *H01M 10/6554* | (2014.01) |
| *H01M 10/6556* | (2014.01) |

(52) U.S. Cl.
CPC ..... *H01M 10/6568* (2015.04); *H01M 10/486* (2013.01); *H01M 10/613* (2015.04); *H01M 10/615* (2015.04); *H01M 10/625* (2015.04); *H01M 10/6554* (2015.04); *H01M 10/6556* (2015.04)

(58) Field of Classification Search
CPC ............. H01M 10/486; H01M 10/617; H01M 10/6567–6569; H01M 10/613; H01M 10/615; H01M 10/627; H01M 10/635; H02J 7/00041; H02J 7/00309; H02J 7/007192; H02J 2310/62; B60L 53/302; B60L 53/60; B60L 58/26; B60L 58/27
See application file for complete search history.

(56) References Cited

U.S. PATENT DOCUMENTS

| | | | | |
|---|---|---|---|---|
| 2009/0246596 A1* | 10/2009 | Sridhar | .................. | B60L 58/30 |
| | | | | 429/513 |
| 2010/0212338 A1* | 8/2010 | Hermann | ............ | H01M 10/486 |
| | | | | 62/118 |
| 2012/0187900 A1* | 7/2012 | Murawaka | ................ | B60L 7/12 |
| | | | | 320/106 |
| 2016/0272044 A1* | 9/2016 | Cheng | ................ | B60H 1/00392 |
| 2018/0006347 A1* | 1/2018 | Porras | ................ | H01M 10/486 |
| 2018/0115029 A1* | 4/2018 | Ren | ......................... | B60L 58/26 |
| 2020/0274210 A1* | 8/2020 | Bae | ....................... | H01M 10/63 |
| 2022/0393263 A1* | 12/2022 | Arai | .................. | H01M 10/6551 |
| 2023/0318070 A1* | 10/2023 | Ogihara | ................ | H01M 10/66 |
| | | | | 429/62 |

* cited by examiner

*Primary Examiner* — Allison Bourke
*Assistant Examiner* — Travis L. Martin
(74) *Attorney, Agent, or Firm* — Foley & Lardner LLP

(57) ABSTRACT

The present disclosure is directed to an apparatus. The apparatus can include an actuator having a plurality of openings. Each of the plurality of openings can couple with a thermal management loop. The thermal management loop can couple with a battery module cold plate. The actuator can select, based on a parameter, one fluid channel of the thermal management loop to control fluid distribution through the plurality of openings and through the thermal management loop to regulate a temperature of the battery module.

13 Claims, 13 Drawing Sheets

1000

1005 — Receive parameter

1010 — Determine state

1015 — Transmit signal

1200

1205

Provide apparatus

THERMAL SYSTEM

INTRODUCTION

Systems can include electrical components that can generate heat during operation. Such components can have varying performance characteristics and lifetimes under different temperature conditions.

SUMMARY

Electrical systems may require thermal management to optimize system lifetime and performance. The systems and methods of the present technical solution include an apparatus powered by a battery module of a battery system to thermally regulate the battery module and a heat generating device. The systems and methods of the present technical solution include at least one sensor coupled with a portion of the battery system to detect a temperature of a portion of the battery system. The systems and methods of the present technical solution can control a flow of fluid through one or more pipes of the apparatus to warm or cool the fluid to warm or cool the battery module via one or more liquid coolants or coolant plates. For example, the systems and methods of the present technical solution can cause one or more openings of a four-way valve to open or close such that a radiator, a chiller, or a heater cools or warms the fluid in response to a detected temperature.

At least one aspect is directed to an apparatus. The apparatus can include an actuator having a plurality of openings. Each of the plurality of openings can couple with a respective fluid channel. Each of the respective fluid channels can couple with a battery module. The actuator can select, based on a parameter, one of the fluid channels to control fluid distribution through the plurality of openings and through each fluid channel to regulate a temperature of the battery module.

At least one aspect is directed to a data processing system. The data processing system can include one or more processors and memory that stores instructions that are executable by the one or more processors. The instructions can cause the one or more processors to receive a parameter, determine, based on the parameter, an operating state from a plurality of operating states, and transmit, to an actuator having a plurality of openings, a control signal that causes the actuator to at least partially block one or more of the plurality of openings based on the operating state to control fluid distribution through the plurality of openings.

At least one aspect is directed to an apparatus. The apparatus can include an actuator fluidly coupled with a radiator, a heater, and a chiller. The actuator can select between a first mode of operation, a second mode of operation, a third mode of operation, and a fourth mode of operation based on a parameter. The actuator can inhibit fluid from passing through the heater and the chiller in the first mode of operation. The actuator can inhibit fluid from passing through the heater in the second mode of operation. The actuator can inhibit fluid from passing through the heater and the radiator in the third mode of operation. The actuator can inhibit fluid from passing through the radiator and the chiller in the fourth mode of operation.

At least one aspect is directed to a method. The method can include determining, based on a parameter, a state of operation. The method can include selecting, by an actuator having a plurality of openings each coupled with a respective fluid channel, the state of operation to control fluid distribution through each fluid channel.

At least one aspect is directed to a method. The method can include receiving, by a processor, from one or more sensors, a parameter. The method can include determining, by the processor, based on the parameter, an operating state from a plurality of operating states. The method can include transmitting, by the processor, to an actuator having a plurality of openings, a control signal that causes the actuator to at least partially block one or more of the plurality of openings based on the operating state to control fluid distribution through the plurality of openings.

At least one aspect is directed to a method. The method can include selecting, by an actuator, a first mode of operation, a second mode of operation, a third mode of operation, or a fourth mode of operation based on a parameter. The method can include at least partially inhibiting, by the actuator, fluid from passing through a heater and a chiller in the first mode of operation. The method can include at least partially inhibiting, by the actuator, fluid from passing through the heater in the second mode of operation. The method can include at least partially inhibiting, by the actuator, fluid from passing through the heater and a radiator in the third mode of operation. The method can include at least partially inhibiting, by the actuator, fluid from passing through the radiator and the chiller in the fourth mode of operation.

At least one aspect is directed to a system. The system can include a battery module, a power electronic module, and an apparatus to thermally regulate the battery module and the power electronic module. The apparatus can include an actuator having a plurality of openings. Each of the plurality of openings can couple with a respective fluid channel. Each of the respective fluid channels can couple with the battery module. The actuator can select, based on a parameter, one of the fluid channels to control fluid distribution through the plurality of openings and through each fluid channel to regulate the battery module.

At least one aspect is directed to a method. The method can include providing an apparatus. The apparatus can include an actuator having a plurality of openings. Each of the plurality of openings can couple with a respective fluid channel. Each of the respective fluid channels can couple with the battery module. The actuator can select, based on a parameter, one of the fluid channels to control fluid distribution through the plurality of openings and through each fluid channel to regulate the battery module.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
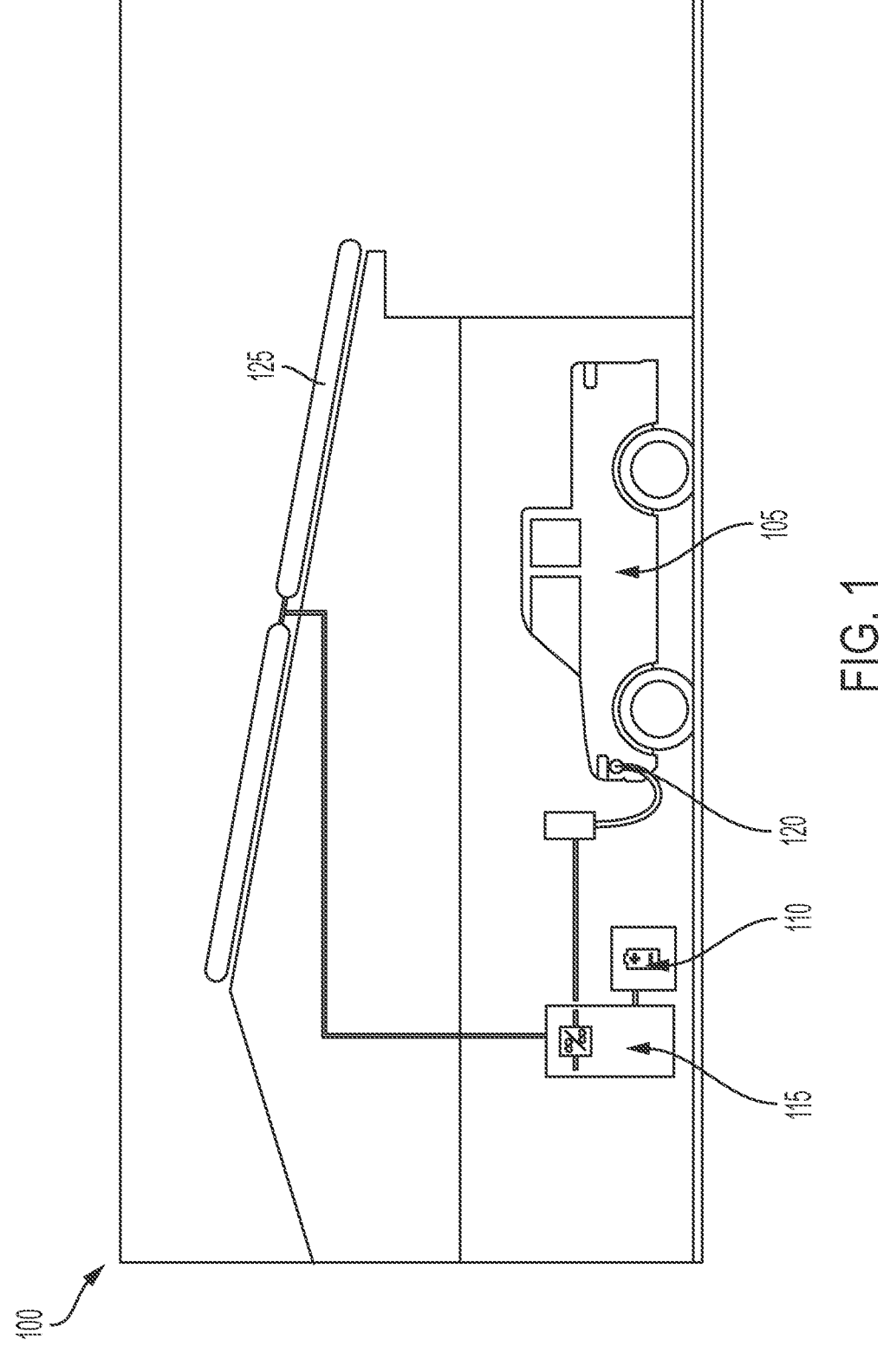
FIG. 1 depicts an example residential energy storage system, in accordance with implementations.

Following below are more detailed descriptions of various concepts related to, and implementations of, methods, apparatuses, and systems of providing a grounding path through a header apparatus. The various concepts introduced above and discussed in greater detail below may be implemented in any of numerous ways.

The present disclosure is directed to a liquid thermal management apparatus to extend the lifetime of a battery module and a power electronic module ("PEM"). The apparatus can include a heater, a radiator, and a vapor compression-based chiller. The apparatus can include one or more fluid lines or cold plates that couple the battery module and the PEM with the heater, the radiator, and the chiller. The apparatus can include an actuator, such as a four-way valve, to select between a first mode of operation, a second mode of operation, a third mode of operation, and a fourth mode of operation (e.g., by at least partially opening or closing one or more openings of the valve). The actuator can be powered by the battery module. In the first mode of operation (e.g., at a mild ambient temperature), the actuator can inhibit fluid within the fluid lines from passing through the heater and the chiller, such that fluid flowing through the actuator flows through the radiator for heat exchange with ambient air for energy saving purposes. In the second mode of operation (e.g., at a warm ambient temperature), the actuator can inhibit fluid from passing through the heater, but allow fluid to flow through the radiator and the chiller in a controllable ratio to extend a lifetime of the compressor and to save energy. In the third mode of operation (e.g., at a hot ambient temperature), the actuator can inhibit fluid from passing through the heater and the radiator, such that fluid flowing through the actuator flows through the chiller for maximum cooling purposes. In the fourth mode of operation (e.g., at a cool ambient temperature), the actuator can inhibit fluid from passing through the radiator and the chiller, such that fluid flowing through the actuator flows through the heater for heating purposes. The actuator can select (e.g., switch) between the modes of operation based on sensor inputs. For example, the apparatus can include one or more sensors coupled with the one or more fluid lines or with an exterior portion of the apparatus to detect one or more parameters (e.g., fluid temperature, air temperature, or humidity). The apparatus can include or can be communicably coupled with a processing system that can determine, based on the sensors, a mode of operation. The actuator can receive a signal indicating the mode of operation from the processing system.

Systems and methods of the present technical solution provide a dynamic thermal system that can optimize a stationary battery for product life and overall thermal system life. The systems and methods of the present technical solution include an apparatus coupled with a battery module (e.g., an enclosure having one or more battery cells that can charge and discharge to transmit electricity). The systems and methods of the present technical solution include at least one temperature sensor coupled with a portion of the thermal system of the battery module to detect a temperature of a portion of the thermal system. The systems and methods of the present technical solution can control a flow of fluid (e.g., a coolant) through one or more pipes of the apparatus to warm or cool the fluid to warm or cool the battery module (e.g., through an embedded coolant plate within the battery module). For example, the systems and methods of the present technical solution can cause one or more openings of a four-way valve to open or close such that a radiator, chiller, or heater cools or warms the fluid in response to a detected temperature.

The disclosed solutions have a technical advantage of maintaining a battery at an optimum temperature range. For example, the disclosed solution can maintain a battery (e.g., having one or more battery cells) at a proper operating temperature range even when the battery is exposed to various climates (e.g., cold, heat, outdoor areas, or other climates). The disclosed technical solutions can respond to an ambient temperature surrounding the battery to minimize energy consumption and maximize a lifetime of the battery. For example, when a temperature of a battery cell or a power electronic module (PEM) gets too high or too low, the battery cells (or PEM) can be prevented from charging or discharging by a battery management system (BMS). The disclosed technical solutions can switch to different operating modes according to ambient (e.g., local) climate, or by a user request, to save energy and to extend the lifetime of the battery cells or PEM. As an example, when a battery cell is exposed to fairly hot ambient temperatures, the disclosed solutions can rely on a chiller for a prompt cooling effect. However, relying on the chiller only could lead to frequently stopping or starting the chiller, which can degrade the lifetime of various components (e.g., a compressor). Therefore, when the battery cell reaches a slightly cooler temperature, the disclosed solutions can rely on both a radiator and the chiller or just the radiator to transfer heat to the ambient and maintain an optimal temperature of the battery cell, which may require less energy than primarily relying on the chiller. When a battery cell is exposed to fairly cool ambient temperatures, the disclosed solutions can rely on a heater for heating the battery cell to provide optimum charging and discharging performance. As such, the disclosed solutions provide for a longer battery life (e.g., maintain 70% battery capacity retention over 10 years of usage), more energy saved (e.g., by relying on a radiator using low auxiliary power), longer warranty, and improved battery and PEM performance.

FIG. 1 depicts an example schematic of a system 100. The system 100 can be or can include an energy storage system (e.g., a stationary energy storage system, a residential energy storage system). For example, the system 100 can store and release energy in the form of electricity. The system 100 can facilitate providing power to one or more stationary, or non-stationary, areas such as a building (e.g., a residential home, a commercial building, or other areas). The system 100 can include at least one battery 110 (e.g., a stationary battery or another type of battery) for storing and releasing energy. For example, the battery 110 can be, can include, or can be stored in a battery module 205. For example, the battery 110 can include one or more lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell to separate the anode and cathode from each other and to facilitate transfer of lithium ions between the anode and cathode.

The system 100 can include at least one electric vehicle 105. For example, the electric vehicle 105 can include at least one battery pack (e.g., having one or more battery modules or battery cells) that provides power for the electric vehicle 105. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. For example, the electric vehicle 105 can include a bi-directional electric vehicle such that electricity can flow to or from the battery pack such that the battery pack can be used as an energy storage system to power an area (e.g., building) of the system 100. For example, the system 100 can include at least one charging port 120 that electrically couples the electric vehicle 105 with an area of the system 100, such as a building (e.g., with one or more electrical power sources of the building, such as an electrical grid). Through the charging port 120, the electric vehicle 105 can both receive electrical charge (e.g., to charge the battery cell(s) of the electric vehicle 105) and output electric charge (e.g., from the battery cell(s) of the electric vehicle 105 to a power source of the building). The battery pack of the electric vehicle 105 can be the same as the battery module 205. The battery pack can be different.

The system 100 can include at least one energy source 125. For example, the energy source 125 can include, but is not limited to, a renewable energy source (e.g., solar panels, wind turbines, hydroelectric turbines, or another renewable energy source), or nonrenewable energy source (e.g., electricity grid or another nonrenewable energy source). The energy source 125 can electrically couple with an area of the system 100, such as a building, such that the energy source 125 can provide electrical power to the building. As one example, the energy source 125 can include a solar panel coupled with a portion of the building, such as a roof. The solar panel can provide electricity for the building.

The electric vehicle 105, the battery 110, or the energy source 125, can each couple with one another. For example, the system 100 can include at least one energy control hub 115. The energy control hub 115 can be or can include an inverter, such as a bi-directional inverter for DC to AC power conversion across charging between the electric vehicle 105, the battery 110, or the energy source 125. The electric vehicle 105, the battery 110 (e.g., one or more battery cells), and the energy source 125 can each electrically couple with the control hub 115 such that electrons can flow between the electric vehicle 105, the battery 110, and the energy source 125. The control hub 115 can be or can include at least one processing system to facilitate controlling electricity flow within the area, such as a residential home or commercial building. In other words, the control hub 115 can control electricity flow between the electric vehicle 105, the battery 110, the energy source 125, and the power source of the building.

Figure 2:
FIG. 2 depicts an example thermal system, in accordance with implementations.

FIG. 2 depicts an example perspective view of a battery system 103. For example, the battery system 103 can include the battery 110 stored within at least one battery module 205 (e.g., an enclosure containing the battery 110) and an apparatus 200 coupled with the battery module 205. The apparatus 200 can be at least partially powered by the battery module 205 (e.g., electricity to the apparatus 200 can be provided by the battery 110 of the battery module 205). The apparatus 200 can facilitate thermally regulating the battery module 205 (e.g., regulating a temperature of a portion of the battery module 205 such as the battery 110 within the module 205). The battery module 205 and the apparatus 200 can be disposed within a housing 280 of the battery system 103. For example, the housing 280 can be or can include an exterior shell that at least partially encloses or surrounds the battery module 205 or one or more components of the apparatus 200 from an exterior (e.g., an ambient surrounding). The housing 280 can include a variety of shapes and sizes. For example, the housing 280 can be rectangular, spherical, cylindrical, triangular, or another shape. The housing 280 can be made from a variety of metallic materials, non-metallic materials, or a combination of both. The battery system 103 (e.g., the housing 280) can be positioned in various climates within the system 100. For example, the battery system 103 can be positioned within a building of the system 100. As another example, the battery system 103 can be positioned exterior to a building of the system 100, such that the battery system 103 is exposed to an exterior climate (e.g., outdoors). The housing 280 of the battery system 103 can at least partially surround the apparatus 200 and the battery module 205 to form a portion of the battery system 103.

The battery system 103 can include at least one fluid line (e.g., a fluid loop, a channel, a pipe, a conduit, or other device for a fluid to flow). For example, the battery system 103 can include a fluid line disposed within the housing 280 of the battery system 103. The fluid lines can couple with one or more portions of the battery system 103. For example, each of the fluid lines can couple with the battery module 205 directly (e.g., connecting with one or more portions of the battery module 205) or indirectly (e.g., connecting with one or more additional fluid lines that connect to one or more portions of the battery module 205). For example, the fluid lines can include a plurality of fluid lines that can attach to one another or with one or more portions of the battery system 103 such that each fluid line (e.g., channel, pipe, conduit, or other device) is at least partially fixed relative to the battery system 103. For example, at least one fluid line of the battery system 103 can couple with the battery module 205 (e.g., with a fluid line coupled with or disposed within an enclosure of the battery module 205, with a portion of the enclosure of the battery module 205, with a cold plate disposed within the enclosure, or with another portion of the battery module 205) such that one or more fluid lines or cold plates are disposed within a portion of the battery module 205. For example, the battery module 205 can include at least one fluid channel that allows for fluid to flow within a portion of the battery module 205 (e.g., within a conduit or cold plate disposed within the enclosure of the battery module 205) such that one or more internal components of the battery module 205, such as the battery 110, is exposed to the fluid channel. For example, at least one of the fluid channels can be or can include at least one thermal coolant loop having one or more connected coolant hoses.

The battery module 205 can include at least one first fluid channel 210 and at least one second fluid channel 215. For example, the first fluid channel 210 can be or can include an inlet fluid channel (e.g., of a thermal coolant loop such that fluid within the first fluid channel 210 flows in a direction into an interior of the enclosure of the battery module 205). The second fluid channel 215 can be or can include an outlet fluid channel (e.g., of a thermal coolant loop such that fluid within the second fluid channel 215 flows in a direction out of an interior of the enclosure of the battery module 205). The first fluid channel 210 and the second fluid channel 215 can include one or more distinct or separate channels (e.g., conduits) that couple with one another. The first fluid channel 210 and the second fluid channel 215 can be formed from one unitary conduit, as another example. The first fluid channel 210 and the second fluid channel 215 can fluidly couple with one another to form a fluid loop such that fluid can flow between the first fluid channel 210 and the second fluid channel 215. For example, the first fluid channel 210 the second fluid channel 215 can couple with one another through one or more additional fluid channels (e.g., pipes, tubes, conduits, or other channels) such that fluid can flow in a looping direction between the first fluid channel 210 and the second fluid channel 215. For example, fluid can flow in a clockwise direction. As another example, fluid can flow in a counterclockwise direction.

The apparatus 200 can include at least one actuator 220. For example, the actuator 220 can be or can include a valve. The actuator 220 can include an electric valve, a pneumatic valve, a hydraulic valve, an electro-hydraulic valve, or another type of valve. The actuator 220 can include various types of actuators including, but not limited to, flow regulators. The actuator 220 can include one or more openings in which fluid can flow through. For example, the actuator 220 can be a four-way valve. The actuator 220 can include four openings or ports spaced around a fluid chamber of the actuator. For example, the actuator 220 can include a first opening 285, a second opening 290, a third opening 295, or a fourth opening 297. The actuator 220 can include one or more stoppers, blocks, plugs, or other components that can block (e.g., at least partially close, fully close, occlude, obstruct, clog, cover, or impede) one or more of the openings such that fluid cannot flow through at least a portion of the opening. For example, the actuator 220 can include a ball plug, a cylindrical plug, a tapered plug, or another type of stopper. Each of the openings 285, 290, 295, 297 can couple with a fluid channel that can fluidly couple with the first fluid channel 210 or the second fluid channel 215. For example, each opening can couple with a conduit, pipe, tube, or other channel in which fluid can flow such that fluid can flow between each opening and each conduit coupled with the openings. The fluid channels can include one or more conduits, pipes, tubing, or other channels that couple with a portion of the battery module 205 (e.g., distinct fluid channels or pipes can couple with the battery module 205 via the first fluid channel 210 or the second fluid channel 215) such that the actuator 220 is fluidly coupled with a fluid channel or cold plate disposed within the battery module 205 (e.g., fluid can flow between the actuator 220 and a fluid channel within a portion of the battery module 205).

The apparatus 200 can include at least one second actuator 225. For example, the second actuator 225 can be or can include a valve coupled with a heat generating device such as a power electronic module ("PEM") 265 (e.g., a high-voltage DC to DC converter with high heat generation), a PCB, a screen, an LED bar, or another heat generating device. For example, the second actuator 225 can couple the PEM 265 with one or more of the fluid channels to control fluid flow to one or more fluid channels or cold plates within the PEM 265 (e.g., within a housing or enclosure of the PEM 265 that at least partially surrounds one or more electrical components of the PEM 265). For example, the second actuator 225 can include a fluid control valve with one or more stoppers, blocks, or plugs that can regulate (e.g., at least partially open or close) an opening of the fluid channel coupled with the valve such that fluid flow rate can be controlled through a fluid channel or to a cold plate disposed within a housing of the PEM 265. The second actuator 225 can include a ball plug, a cylindrical plug, a tapered plug, or another type of stopper. The second actuator 225 can include an electric valve, a pneumatic valve, a hydraulic valve, an electro-hydraulic valve, or another type of valve. The second actuator 225 can include various types of actuators including, but not limited to, flow regulators.

The apparatus 200 can include various components that can facilitate regulating a temperature of the battery module 205 (or components thereof) or the PEM 265. For example, the apparatus 200 can include at least one radiator 240. The radiator 240 can be or can include any device or heat exchanger in which fluid (e.g., from the fluid channels) can circulate through one or more exposed conduits (e.g., pipes). For example, the radiator 240 can be liquid cooled. The radiator 240 can include one or more fans 245 to create a flow of air or other fluid (e.g., a turbine, a device with rotating blades that creates a current of air for cooling) proximate the exposed conduits or the fluid channels coupled with the radiator 240. The fan 245 can couple with various portions of the battery system 103. For example, the fan 245 can couple with a portion of the housing 280 of the battery system 103 such that the fan 245 circulates air or other fluid between the ambient surrounding the battery system 103 and an internal portion of the housing 280. The radiator 240 or the fan 245 can facilitate cooling fluid within the fluid channels. The apparatus 200 can include at least one heater 250. For example, the heater 250 can be or can include any device that can heat a fluid including, but not limited to, a low voltage ("LV") heater. The heater 250 can facilitate heating fluid within the fluid channels. The apparatus 200 can include at least one chiller 255. The chiller 255 can be or can include any device that can cool fluid flowing within the fluid channels including, but not limited to, a plate chiller (e.g., a vapor compression-based chiller). The fluid channels can facilitate fluidly coupling the radiator 240, the heater 250, and the chiller 255 such that fluid can circulate between the radiator 240, the heater 250, and the chiller 255.

The apparatus 200 can include various components to facilitate circulating fluid or controlling a characteristic (e.g., pressure, temperature, volume, or other characteristic) of fluid within the fluid channels. For example, the apparatus 200 can include at least one compressor 260. The compressor 260 can be or can include any device that can compress fluid flowing within the fluid channels. The compressor 260 can be, for example, a mini compressor. The apparatus 200 can include at least one reservoir 230. For example, the reservoir 230 can be or can include any container, tank, basin, receptacle, or space for containing fluid (e.g., fluid within the fluid channels or another fluid). The apparatus 200 can include at least one pump 235. For example, the pump 235 can be or can include any device that facilitates pumping fluid through the fluid channels (e.g., such that the fluid includes a flow velocity that is greater than or equal to 0 m/s, to circulate the fluid). The apparatus 200 can include at least one expansion valve 305 (depicted in at least FIG. 3). For example, the expansion valve 305 can be or can include any valve that controls a flow of fluid. The expansion valve 305, for example, can facilitate removing or reducing pressure of fluid such that the fluid can expand or change state. The expansion valve 305 can be or can include a device that does not use an electronic control system. For example, the expansion valve 305 can be or can include a thermal expansion valve ("TXV") or an electronic expansion valve ("EXV").

The openings 285, 290, 295, 297 of the actuator 220 can fluidly couple one or more components of the apparatus 200 with one another. For example, the actuator 220 can be positioned such that the actuator 220 can control fluid flow between the battery module 205, the PEM 265, the radiator 240, the heater 250, the chiller 255, or another component of the apparatus 200.

Figure 3:
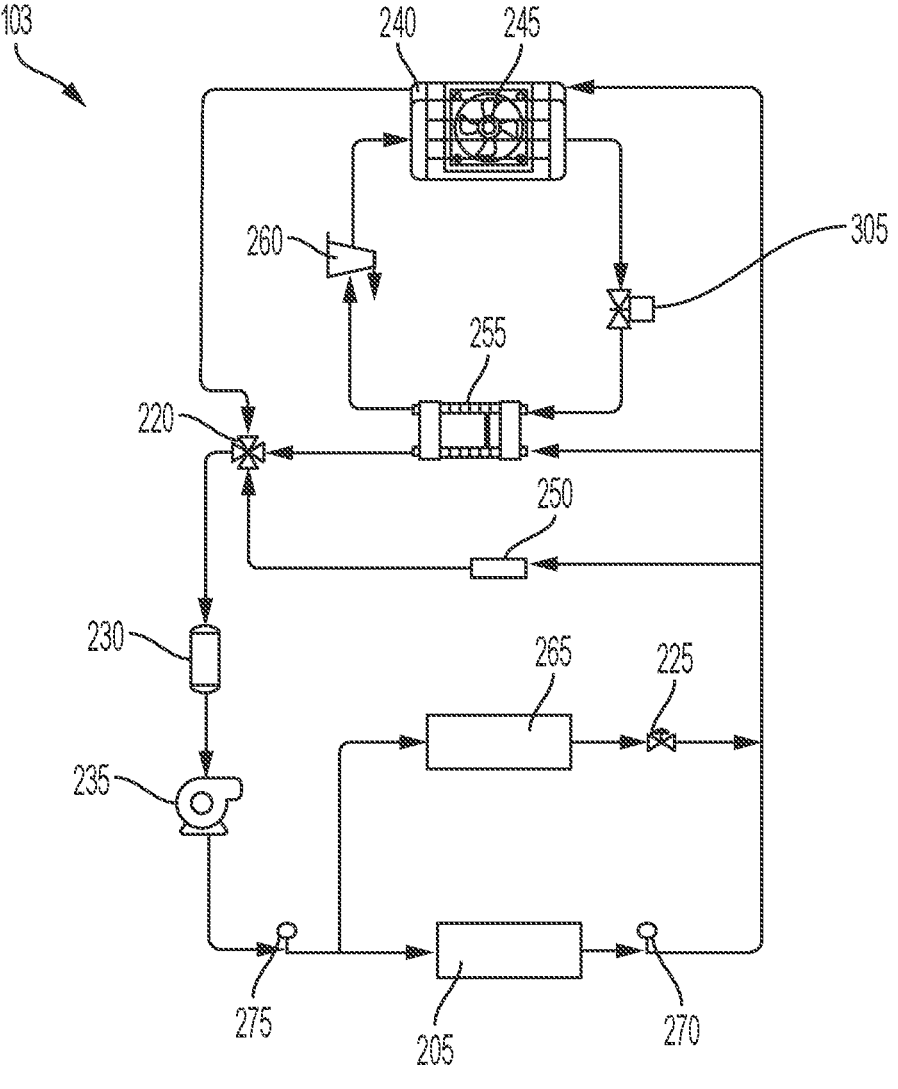
FIG. 3 depicts an example schematic of the thermal system of FIG. 2, in accordance with implementations.

FIG. 3 depicts an example schematic of the battery system 103. For example, FIG. 3 depicts an example direction of fluid flow between the components of the apparatus 200, the battery module 205, or the PEM 265 when each opening of the actuator 220 is open (e.g., fluid can flow through each opening, depicted by solid lines with arrows showing a general direction of fluid flow). This example is for illustrative purposes. It should be noted that the positioning of the various components of the battery system 103 and the direction of fluid flow can vary. Fluid (e.g., a coolant) can flow from the battery module 205 or the PEM 265 through the radiator 240, the heater 250, or the chiller 255. In parallel, fluid can flow from the radiator 240 or fan 245 through the expansion valve 305, through the chiller 255, or through the compressor 260. Fluid can flow from the radiator 240, the heater 250, or the chiller 255 through the reservoir 230 or pump 235 and back through the battery module 205 or the PEM 265.

The apparatus 200 can include at least one sensor. For example, the apparatus 200 can include one or more pressure sensors, temperature sensors, flow velocity sensors, or other sensors. For example, the apparatus 200 can include a first temperature sensor 270, a second temperature sensor 275, a third temperature sensor 420 (depicted in at least FIG. 4), a fourth temperature sensor (e.g., within an enclosure of the battery module 205), or a fifth temperature sensor (e.g., within an enclosure of the PEM 265). The first temperature sensor 270 can couple with one or more portions of a fluid channel such that the first temperature sensor 270 can measure a temperature of fluid within the fluid channels. For example, the first temperature sensor 270 can couple with a fluid channel at a position that is downstream of the battery module 205 (e.g., proximate the second fluid channel 215). The second temperature sensor 275 can couple with one or more portions of a fluid channel such that the second temperature sensor 275 can measure a temperature of fluid within the fluid channels. For example, the second temperature sensor 275 can couple with a fluid channel at a position that is upstream of the battery module 205 (e.g., proximate the first fluid channel 210). The third temperature sensor 420 can couple with a portion of the battery system 103 (e.g., the housing 280) that is at least partially exposed to an ambient surrounding the battery system 103 such that the third temperature sensor 420 can measure a temperature or humidity value of the ambient surrounding the battery system 103. For example, the third temperature sensor 420 can couple with a portion of the housing 280 positioned near the radiator 240. The fourth temperature sensor can couple with one or more portions within a housing of the battery module 205. For example, the fourth temperature sensor can couple with a portion of a battery management system coupled with the battery module 205. The fifth temperature sensor can couple with one or more portions within a housing of the PEM 265. Each of the first temperature sensor 270, the second temperature sensor 275, the third temperature sensor 420, the fourth temperature sensor, or the fifth temperature sensor can be or can include a variety of sensors that can measure temperature or another characteristic including, but not limited to, a digital temperature sensor, a thermistor, a thermocouple, a thermopile, a manometer, a strain gauge, a barometer, electromagnetic sensors, mechanical sensors (e.g., turbines), a moisture meter, or another type of sensor.

Figure 4:
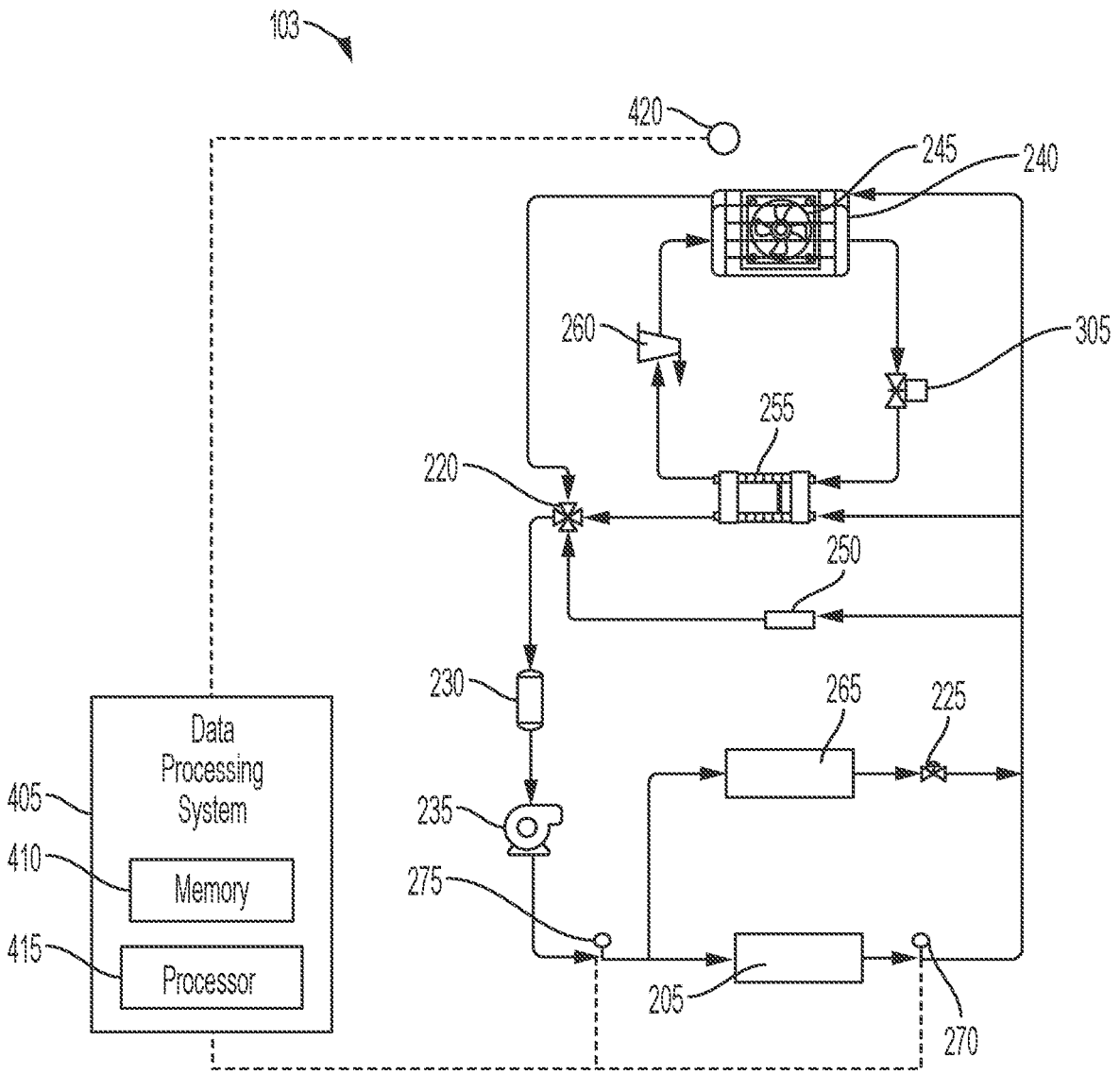
FIG. 4 depicts an example control schematic of the thermal system of FIG. 2, in accordance with implementations.

FIG. 4 depicts an example schematic of the battery system 103. For example, FIG. 4 depicts an example direction of fluid flow between the components of the apparatus 200, the battery module 205, and the PEM 265 when each opening of the actuator 220 is open (e.g., fluid can flow through each opening, depicted by solid lines with arrows showing a general direction of fluid flow). This example is for illustrative purposes. It should be noted that the positioning of the various components of the battery system 103 and the direction of fluid flow can vary. The apparatus 200 can include or can couple with a data processing system 405. The data processing system 405 can be or can include memory 410 (e.g., RAM, ROM, NVRAM, Flash Memory, hard disk storage, etc.) that may store data or computer code for facilitating at least some of the various processes described herein. The data processing system 405 can be or can include at least one processor 415 that may be implemented as a general-purpose processor, an application specific integrated circuit (ASIC), one or more field programmable gate arrays (FPGAs), a digital signal processor (DSP), a group of processing components, or other suitable electronic processing components structured to control the operation of the data processing system 405.

The components of the data processing system 405 and the apparatus 200 can communicably or operatively couple with each other wirelessly or by one or more wires. For example, the components of the data processing system 405 and the apparatus 200 can couple with each other over at least one external network. The external network can be any type of network. For example, the external network can include a wireless network interface including various telephone lines, LAN or WAN links (e.g., 802.11X, T1, T3, Gigabit Ethernet, Infiniband, ZigBee, Bluetooth, Internet, Satellite), a wired network interface (e.g., Ethernet, USB, Thunderbolt), or any combination thereof. One or more of the first temperature sensor 270, the second temperature sensor 275, the third temperature sensor 420, the fourth temperature sensor, or the fifth temperature sensor can communicably or operably couple with the data processing system 405. For example, each of the first temperature sensor 270, the second temperature sensor 275, the third temperature sensor 420, the fourth temperature sensor, or the fifth temperature sensor can couple with the data processing system 405 by one or more wires or wirelessly (e.g., via the network, via a near-field communication, or via another wireless method). The actuator 220, or a component of the actuator 220, can communicably or operably couple with the data processing system 405. For example, the actuator 220 can couple with the data processing system 405 by one or more wires or wirelessly such that the data processing system 405 can communicate with the actuator 220.

The data processing system 405 can control one or more operations of the apparatus 200, such as the actuator 220, to cause the apparatus 200 to operate in a particular mode of operation. For example, opening or closing one or more openings 285, 290, 295, 297 of the actuator 220 can cause the apparatus 200 to select (e.g., switch, open or close one or more openings) between a plurality of modes of operation. For example, a portion of the actuator 220 (e.g., a stopper, plug, or other portion) can mechanically move (e.g., slide, rotate, inflate, or other movement) from a first position, in which the stopper or plug is blocking a first subset (e.g., 0, 1, 2, 3, or 4) of the openings, to a second position, in which the stopper or plug is blocking a second subset of the openings. The first subset can include at least one or more different openings than the second subset. The data processing system 405 (e.g., the one or more processors 415) can control the actuator 220 to cause the actuator 220 to open or close one or more of the openings 285, 290, 295, 297. For example, the processor 415 can receive at least one parameter. The parameter can include an environmental parameter from one of the first temperature sensor 270, the second temperature sensor 275, the third temperature sensor 420, the fourth temperature sensor, or the fifth temperature sensor. The processor 415 can receive one parameter from each of the first temperature sensor 270, the second temperature sensor 275, the third temperature sensor 420, the fourth temperature sensor, and the fifth temperature sensor, as an example. The parameter can include a user input to the data processing system 405. For example, the processor 415 can receive a user input (e.g., via a user interface of the data processing system 405, via a keypad of the data processing system 405, via a computer coupled with the data processing system 405) indicating a temperature value, a pressure value, a selection of a mode of operation, or another characteristic of the battery system 103. The processor 415 can determine, based on the parameter, a temperature of a portion of the battery system 103. For example, the processor 415 can determine an approximate temperature of fluid within the second fluid channel 215 based on one or more parameters transmitted from the first temperature sensor 270. The processor 415 can determine an approximate temperature of fluid within the first fluid channel 210 based on one or more parameters transmitted from the second temperature sensor 275. The processor 415 can determine an approximate temperature of an ambient surrounding of the battery system 103 based on one or more parameters transmitted from the third temperature sensor 420. The processor 415 can determine an approximate temperature within the battery module 205 based on one or more parameters transmitted from the fourth temperature sensor. The processor 415 can determine an approximate temperature within the PEM 265 based on one or more parameters transmitted from the fifth temperature sensor. The processor 415 can determine an approximate temperature based on a user input.

The processor 415 can cause the actuator 220 to operate in one of a plurality of modes of operation. For example, the actuator 220 can switch between at least two modes of operation. The actuator 220 can switch between at least three modes of operation, as another example. The actuator 220 can switch between at least four modes of operation, as yet another example. The actuator 220 can switch between more than four modes of operation. The processor 415 can cause the actuator 220 to change modes of operation based on a determined temperature of a portion of the battery system 103. For example, the processor 415 can cause the actuator 220 to operate in a first mode of operation upon determining that an ambient temperature of the battery system 103 is at a first range (e.g., based on one or more parameters from the third temperature sensor 420). As an example, the processor 415 can cause the actuator 220 to operate in a first mode of operation upon determining that the battery system 103 is in a generally mild ambient temperature range (e.g., 20-25° C.). This range is for illustrative purposes only. The processor 415 can cause the actuator 220 to operate in a first mode of operation upon determining that the battery system 103 is at a different temperature range (e.g., between –60° C. to 60° C., or another range). In the first mode of operation, the processor 415 can cause at least one opening of the actuator 220 to close such that fluid flows through the radiator 240, but not through the heater 250 or the chiller 255, so as to cool the fluid. For example, the radiator 240 can cool the fluid such that the fluid flowing within the battery module 205 can cool a portion of the battery module 205, which can facilitate performance (e.g., charging or discharging) of the one or more battery cells (e.g., the battery 110) in the battery module 205.

The processor 415 can cause the actuator 220 to operate in a second mode of operation upon determining that an ambient temperature of the battery system 103 is at a second range (e.g., based on one or more parameters from the third temperature sensor 420). As an example, the processor 415 can cause the actuator 220 to operate in a second mode of operation upon determining that the battery system 103 is in a generally warm ambient temperature range (e.g., 25-35° C.). This range is for illustrative purposes only. The processor 415 can cause the actuator 220 to operate in a second mode of operation upon determining that the battery system 103 is at a different temperature range (e.g., between –60° C. to 60° C., or another range). In the second mode of operation, the processor 415 can cause at least one opening of the actuator 220 to close such that fluid flows through the radiator 240 and the chiller 255, but not through the heater 250, so as to cool the fluid. For example, the radiator 240 and the chiller 255 can efficiently cool the fluid such that the fluid flowing within the battery module 205 can cool a portion of the battery module 205, which can facilitate performance (e.g., charging or discharging) of the one or more battery cells (e.g., the battery 110) in the battery module 205.

The processor 415 can cause the actuator 220 to operate in a third mode of operation upon determining that an ambient temperature of the battery system 103 is at a third range (e.g., based on one or more parameters from the third temperature sensor 420). As an example, the processor 415 can cause the actuator 220 to operate in a third mode of operation upon determining that the battery system 103 is in a hot ambient temperature range (e.g., 35-45° C.). This range is for illustrative purposes only. The processor 415 can cause the actuator 220 to operate in a third mode of operation upon determining that the battery system 103 is at a different temperature range (e.g., between –60° C. to 60° C., or another range). In the third mode of operation, the processor 415 can cause at least one opening of the actuator 220 to close such that fluid flows through the chiller 255, but not through the radiator 240 or the heater 250, so as to cool the fluid. For example, the chiller 255 can cool the fluid such that the fluid flowing within the battery module 205 can promptly cool a portion of the battery module 205, which can facilitate performance (e.g., charging or discharging) of the one or more battery cells (e.g., the battery 110) in the battery module 205.

The processor 415 can cause the actuator 220 to operate in a fourth mode of operation upon determining that an ambient temperature of the battery system 103 is at a fourth range (e.g., based on one or more parameters from the third temperature sensor 420). As an example, the processor 415 can cause the actuator 220 to operate in a fourth mode of operation upon determining that the battery system 103 is in a generally cool ambient temperature range (e.g., less than −20° C.). This range is for illustrative purposes only. The processor 415 can cause the actuator 220 to operate in a fourth mode of operation upon determining that the battery system 103 is at a different temperature range (e.g., between −60° C. to 60° C., or another range). In the fourth mode of operation, the processor 415 can cause at least one opening of the actuator 220 to close such that fluid flows through the heater 250, but not through the radiator 240 or the chiller 255, so as to warm the fluid. For example, the heater 250 can warm the fluid such that the fluid flowing within the battery module 205 can warm a portion of the battery module 205, which can facilitate reducing degradation of a lifetime of the one or more battery cells (e.g., the battery 110) in the battery module 205.

Figure 5:
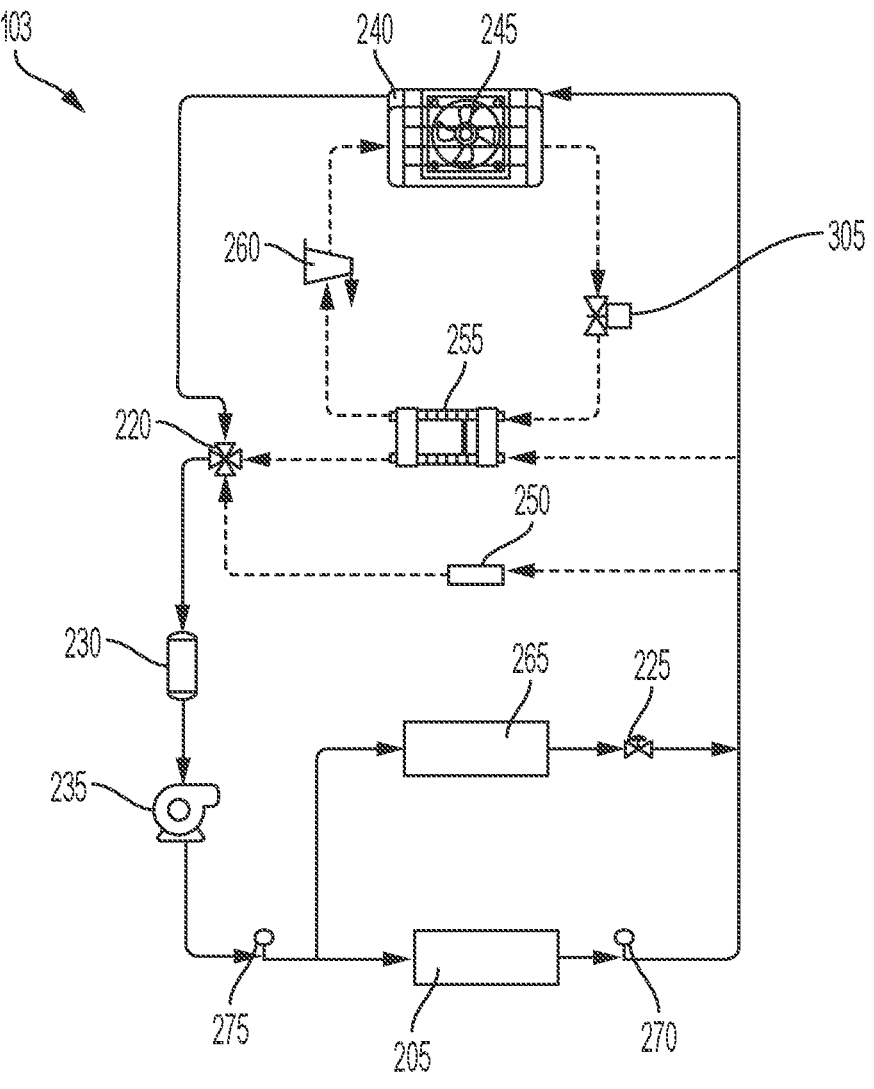
FIG. 5 depicts an example schematic of the thermal system of FIG. 2 in a first mode of operation, in accordance with implementations.

FIG. 5 depicts the apparatus 200 in the first mode of operation. In the first mode of operation, the actuator 220 can at least partially close the first opening 285 and the second opening 290 of the actuator 220 such that the actuator 220 at least partially bypasses the heater 250 and the chiller 255 (e.g., at least partially occludes fluid from flowing through the heater 250 and the chiller 255, as depicted by dashed lines in FIG. 5). In the first mode of operation, for example, the actuator 220 can cause fluid to flow only through the radiator 240 (e.g., out of a group consisting of the radiator 240, the heater 250, and the chiller 255). For example, the dashed lines depicted in FIG. 5 represent an example schematic in which fluid does not flow (e.g., does not have a flow velocity that is greater than 0 m/s).

Figure 6:
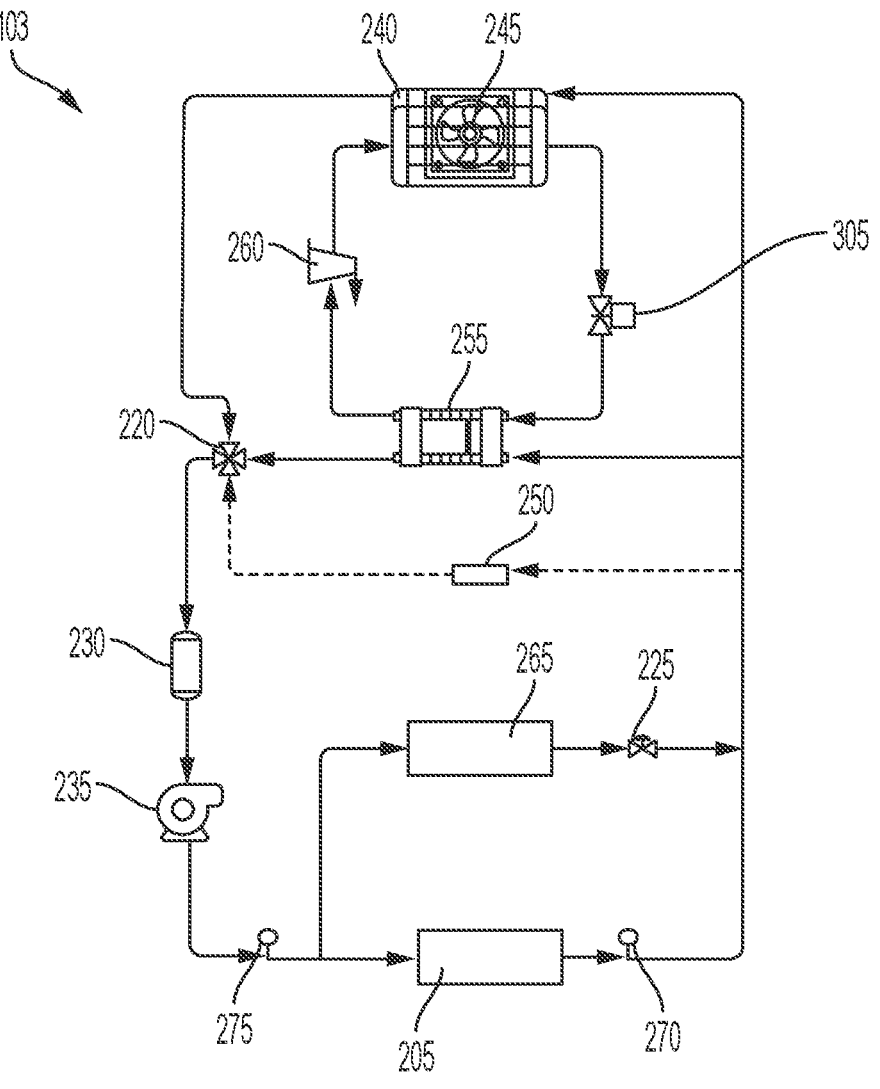
FIG. 6 depicts an example schematic of the thermal system of FIG. 2 in a second mode of operation, in accordance with implementations.

FIG. 6 depicts the apparatus 200 in the second mode of operation. In the second mode of operation, the actuator 220 can at least partially close the second opening 290 of the actuator 220 such that the actuator 220 at least partially bypasses the heater 250 (e.g., at least partially occludes fluid from flowing through the heater 250, as depicted by dashed lines in FIG. 6). In the second mode of operation, for example, the actuator 220 can cause fluid to flow only through the radiator 240 and the chiller 255 (e.g., out of a group consisting of the radiator 240, the heater 250, and the chiller 255). For example, the dashed lines depicted in FIG. 6 represent an example schematic in which fluid does not flow (e.g., does not have a flow velocity that is greater than 0 m/s). In the second mode of operation, the data processing system 405 can control a ratio of fluid flow through the radiator 240 and the chiller 255. For example, the processor 415 can cause the actuator to open or close one or more openings such that N % of fluid flows through the radiator 240 and a corresponding (100%-N %) of fluid flows through the chiller 255, where N is in the range of 0-100%.

Figure 7:
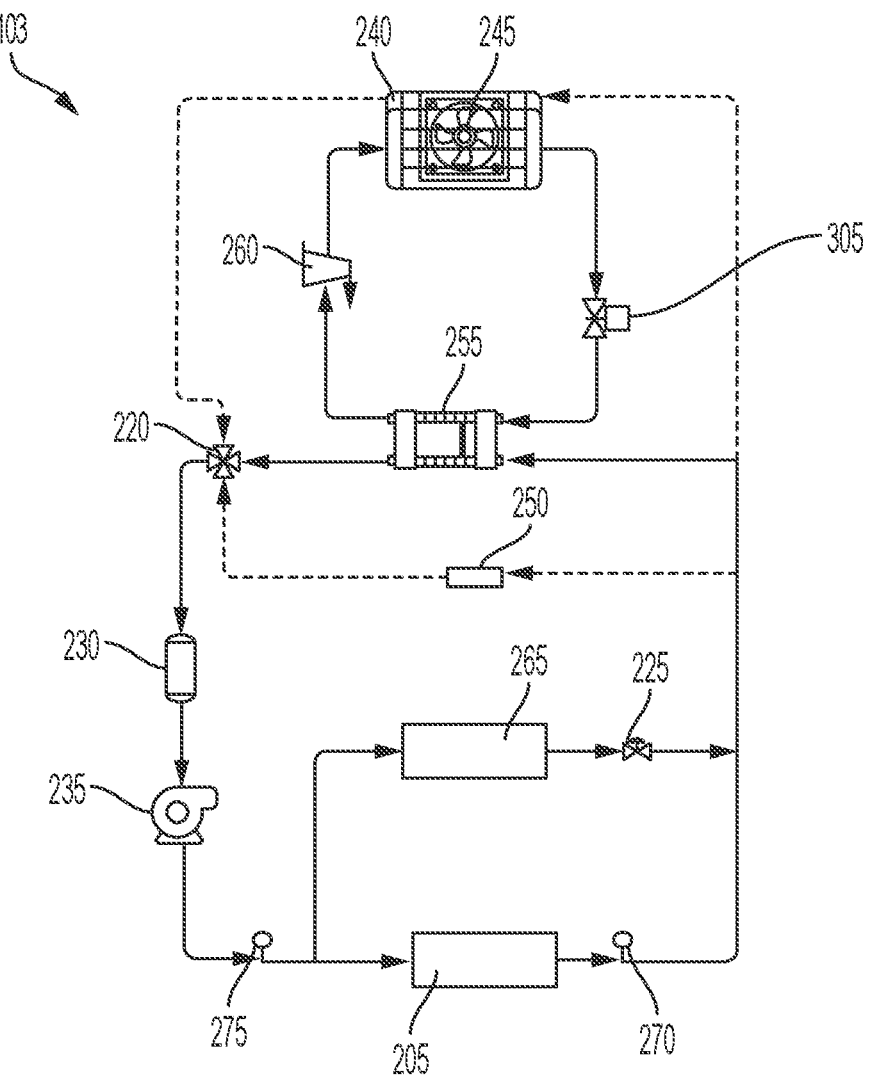
FIG. 7 depicts an example schematic of the thermal system of FIG. 2 in a third mode of operation, in accordance with implementations.

FIG. 7 depicts the apparatus 200 in the third mode of operation. In the third mode of operation, the actuator 220 can at least partially close the second opening 290 and the third opening 295 of the actuator 220 such that the actuator 220 at least partially bypasses the radiator 240 and the heater 250 (e.g., at least partially occludes fluid from flowing through the radiator 240 and the heater 250, as depicted by dashed lines in FIG. 7). In the third mode of operation, for example, the actuator 220 can cause fluid to flow only through the chiller 255 (e.g., out of a group consisting of the radiator 240, the heater 250, and the chiller 255). For example, the dashed lines depicted in FIG. 7 represent an example schematic in which fluid does not flow (e.g., does not have a flow velocity that is greater than 0 m/s).

Figure 8:
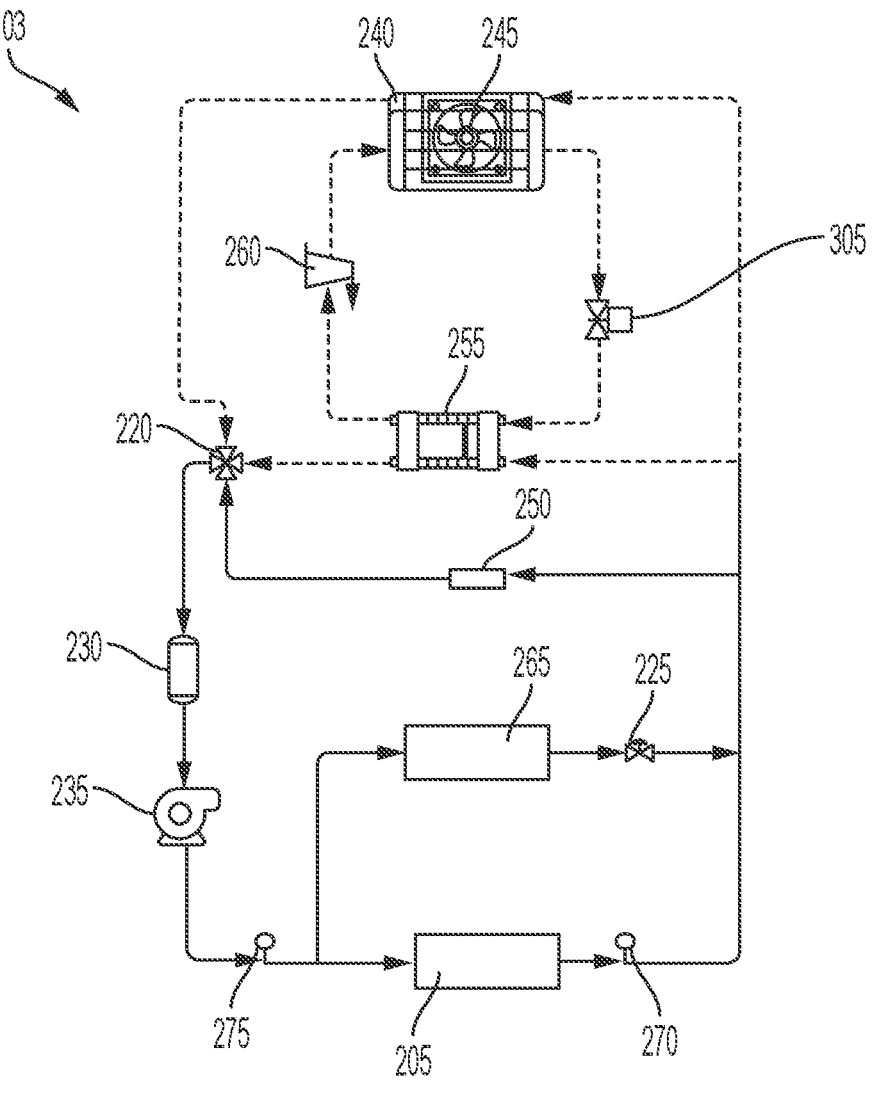
FIG. 8 depicts an example schematic of the thermal system of FIG. 2 in a fourth mode of operation, in accordance with implementations.

FIG. 8 depicts the apparatus 200 in the fourth mode of operation. In the fourth mode of operation, the actuator 220 can at least partially close the first opening 285 and the third opening 295 of the actuator 220 such that the actuator 220 at least partially bypasses the radiator 240 and the chiller 255 (e.g., at least partially blocks (e.g., occludes) fluid from flowing through the radiator 240 and the chiller 255, as depicted by dashed lines in FIG. 8). In the third mode of operation, for example, the actuator 220 can cause fluid to flow only through the heater 250 (e.g., out of a group consisting of the radiator 240, the heater 250, and the chiller 255). For example, the dashed lines depicted in FIG. 8 represent an example schematic in which fluid does not flow (e.g., does not have a flow velocity that is greater than 0 m/s).

In each of the various modes of operation, the second actuator 225 can facilitate controlling fluid flow within the PEM 265. For example, the data processing system 405 can communicably or operably couple with the second actuator 225 by one or more wires or wirelessly such that the data processing system 405 can communicate with the second actuator 225. The data processing system 405 can cause, by the processor 415, the second actuator 225 to open or close the opening of the second actuator 225 in response to receiving the parameter. For example, the processor 415 can cause the second actuator 225 to open or close in response to receiving a temperature parameter from one of the temperature sensors. As another example, the processor 415 can cause the second actuator 225 to open or close in response to receiving a user input to the data processing system 405. For example, in the fourth mode of operation, the processor 415 can cause the second actuator 225 to at least partially inhibit fluid flow through the PEM 265 to avoid energy loss used for warming the battery module 205.

The actuator 220 and the second actuator 225 can select modes of operation responsive to a manual input to the apparatus 200. For example, the openings of the actuator 220 or the opening of the second actuator 225 can open or close (e.g., be blocked or unblocked by a stopper) by hand, a tool, or by another device that causes the openings to open or close.

Figure 9:
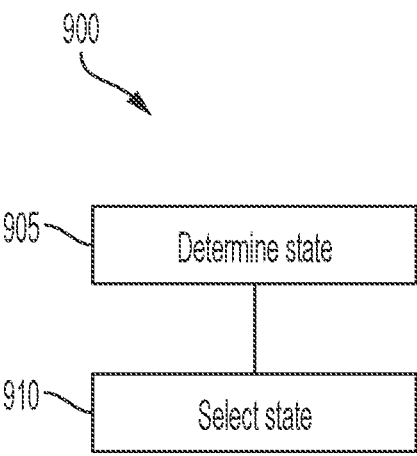
FIG. 9 depicts an example illustration of a process, in accordance with implementations.

FIG. 9 depicts an example method 900 of operating the apparatus 200. The method 900 can include determining a state of operation, as depicted at act 905. For example, the data processing system 405 can receive one or more parameters from one of the first temperature sensor 270, the second temperature sensor 275, the third temperature sensor 420, the fourth temperature sensor, or the fifth temperature sensor to detect or determine a temperature of at least a portion of the battery system 103. For example, the data processing system 405 can detect a temperature of a portion of fluid in one of the fluid channels. The data processing system 405 can detect a temperature of a portion of the battery module 205 (e.g., one or more internal components of the battery module 205). The data processing system 405 can detect an ambient temperature of the battery system 103 (e.g., a temperature surrounding the battery system 103 and the battery 110). The data processing system 405 can detect a temperature of the PEM 265. The data processing system 405 can determine a state of operation based on the parameter. For example, the data processing system 405 can determine if a first, second, third, or fourth state of operation is required based on the detected temperature.

In the first mode of operation, the processor 415 can cause the actuator 220 (e.g., a portion of the actuator 220) to at least partially close the first opening 285 and the second opening 290 of the actuator 220 (e.g., by blocking or unblocking the openings) such that the actuator 220 at least partially bypasses the heater 250 and the chiller 255 (e.g., at least partially blocks (e.g., occludes) fluid from flowing through the heater 250 and the chiller 255). In the first mode of operation, for example, the actuator 220 can cause fluid to flow only through the radiator 240 (e.g., out of a group consisting of the radiator 240, the heater 250, and the chiller 255).

In the second mode of operation, the processor 415 can cause the actuator 220 (e.g., a portion of the actuator 220) to at least partially close the second opening 290 of the actuator 220 (e.g., by blocking or unblocking the opening) such that the actuator 220 at least partially bypasses the heater 250 (e.g., at least partially blocks (e.g., occludes) fluid from flowing through the heater 250). In the second mode of operation, for example, the actuator 220 can cause fluid to flow only through the radiator 240 and the chiller 255 (e.g., out of a group consisting of the radiator 240, the heater 250, and the chiller 255).

In the third mode of operation, the processor 415 can cause the actuator 220 (e.g., a portion of the actuator 220) to at least partially close the second opening 290 and the third opening 295 of the actuator 220 (e.g., by blocking or unblocking the openings) such that the actuator 220 at least partially bypasses the radiator 240 and the heater 250 (e.g., at least partially blocks (e.g., occludes) fluid from flowing through the radiator 240 and the heater 250). In the third mode of operation, for example, the actuator 220 can cause fluid to flow only through the chiller 255 (e.g., out of a group consisting of the radiator 240, the heater 250, and the chiller 255).

In the fourth mode of operation, the processor 415 can cause the actuator 220 (e.g., a portion of the actuator 220) to at least partially close the first opening 285 and the third opening 295 of the actuator 220 (e.g., by blocking or unblocking the openings) such that the actuator 220 at least partially bypasses the radiator 240 and the chiller 255 (e.g., at least partially blocks (e.g., occludes) fluid from flowing through the radiator 240 and the chiller 255). In the fourth mode of operation, for example, the actuator 220 can cause fluid to flow only through the heater 250 (e.g., out of a group consisting of the radiator 240, the heater 250, and the chiller 255).

The data processing system 405 can determine a state of operation based on a user input to the data processing system 405. For example, the processor 415 can receive one or more inputs to the data processing system 405 indicating a selection between one or more of the first, second, third, or fourth mode of operation. As another example, the processor 415 can receive one or more inputs to the data processing system 405 indicating a characteristic of the battery system 103, such as an ambient temperature.

The method 900 can include selecting the state of operation, as depicted at act 910. For example, the actuator 220 can block (e.g., close) at least one opening to select the determined state of operation. For example, the processor 415 can transmit a control signal to the actuator 220 to cause the actuator 220 to close at least one opening (e.g., by rotating the plug). As another example, a manual input to the actuator 220 (e.g., by hand, by tool) can cause the actuator 220 to close at least one opening.

Figure 10:
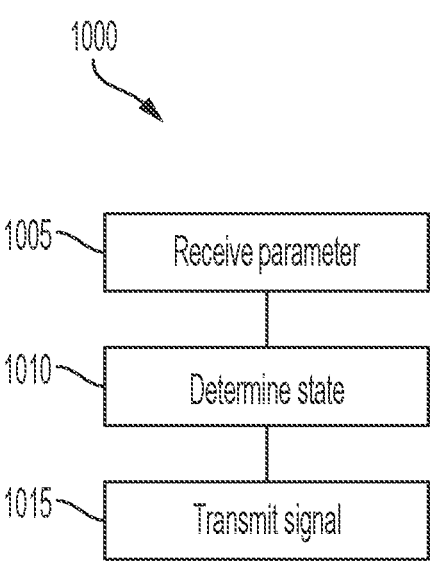
FIG. 10 depicts an example illustration of a process, in accordance with implementations.

FIG. 10 depicts an example method 1000 of operating the apparatus 200. The method 1000 can include receiving a parameter, as depicted at act 1005. For example, the processor 415 of the data processing system 405 can receive one or more parameters, such as a temperature or pressure value, from one or more sensors coupled with a portion of the battery system 103 (e.g., the first temperature sensor 270, the second temperature sensor 275, the third temperature sensor 420, the fourth temperature sensor, or the fifth temperature sensor). As another example, the processor 415 of the data processing system 405 can receive a parameter as a user input to the data processing system 405 (e.g., via one or more user interfaces of the data processing system 405, via a computer coupled with the data processing system 405, or via another input). The user input can indicate a temperature of one or more portions of the battery system 103 or a desired operating state (e.g., of the four operating states described herein).

The method 1000 can include determining a state of operation, as depicted at act 1010. For example, the processor 415 can determine, based on the received parameter, an operating state to maintain or change a temperature of a portion of the battery system 103. For example, the processor 415 can determine that a detected temperature of a portion of the battery system 103 (e.g., the battery 110) is not within a predetermined range, or not within a tolerance of a predetermined range (e.g., within 1%, within 5%, or within another tolerance). The processor 415 can determine, based on the detection, that fluid within the fluid channels needs to increase or decrease to lower or raise the temperature of one or more portions of the battery system 103. As an example, the processor 415 can receive a parameter from the third temperature sensor 420 indicating the ambient temperature of the battery system 103 is high (e.g., greater than 30° C.). The processor 415 can determine that the fluid in the fluid channels requires cooling.

The method 1000 can include transmitting a signal, as depicted at act 1015. For example, the processor 415 can transmit a control signal to the actuator 220 responsive to determining a required operating state. The control signal can cause the actuator 220 to open or close one or more openings such that the actuator 220 activates a predetermined operating state. As an example, the processor 415 can transmit a control signal to the actuator 220 responsive to determining that the fluid requires cooling to cause the actuator 220 to change to (or maintain) the third mode of operation such that the chiller 255 is activated.

Figure 11:
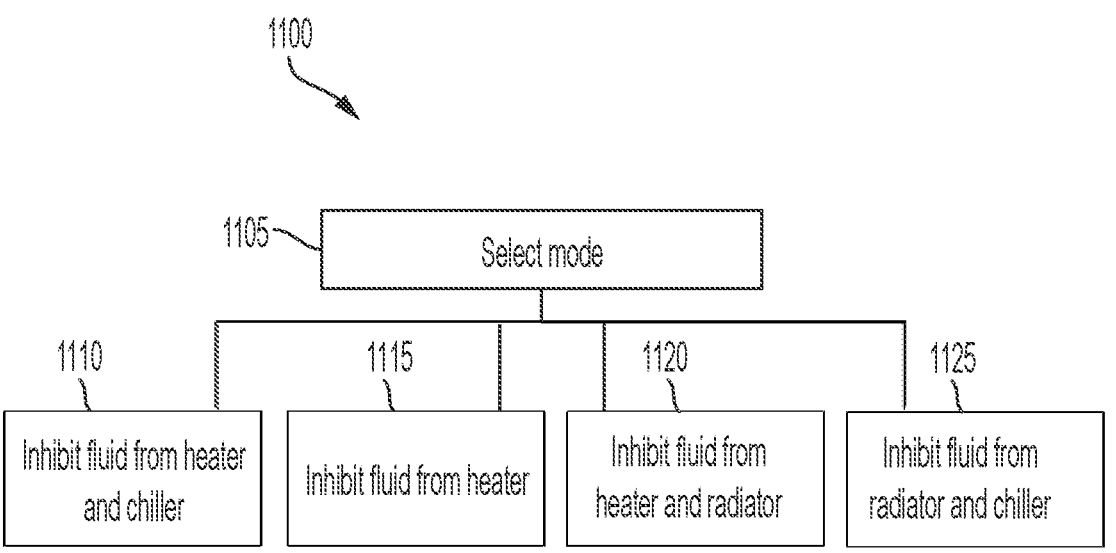
FIG. 11 depicts an example illustration of a process, in accordance with implementations.

FIG. 11 depicts an example method 1100 of operating the apparatus 200. The method 1100 can include selecting a mode of operation, as depicted at act 1105. For example, the apparatus 200 can select a mode of operation in response to a user input or manual input (e.g., using a hand tool or other device). The apparatus 200 can select a mode of operation in response to receiving a control signal from the processor 415, as an example. The apparatus 200 can select at least one mode of operation from a plurality of modes. For example, the apparatus 200 can select one mode from a choice of four or more modes. The apparatus 200 can select a mode of operation based on a detected temperature range of the battery system 103. For example, the apparatus 200 can select a mode in response to the data processing system 405 receiving a parameter from one or more sensors of the battery system 103. The apparatus 200 can select the mode by blocking or unblocking one or more openings of the apparatus 200, for example.

The method 1100 can include at least partially inhibiting fluid from the heater 250 and the chiller 255, as depicted at act 1110. For example, when the first mode of operation is selected, the processor 415 can cause the actuator 220 to at least partially close the first opening 285 and the second opening 290 of the actuator 220 such that the actuator 220 at least partially bypasses the heater 250 and the chiller 255 (e.g., at least partially inhibits fluid from flowing through the heater 250 and the chiller 255). In the first mode of operation, for example, the actuator 220 can cause fluid to flow only through the radiator 240 (e.g., out of the radiator 240, the heater 250, and the chiller 255). In the first mode of operation, the apparatus 200 can facilitate cooling the fluid, for example.

The method 1100 can include at least partially inhibiting fluid from the heater 250, as depicted at act 1115. For example, when the second mode of operation is selected, the processor 415 can cause the actuator 220 to at least partially close the second opening 290 of the actuator 220 such that the actuator 220 at least partially bypasses the heater 250 (e.g., at least partially blocks (e.g., occludes) fluid from flowing through the heater 250). In the second mode of operation, for example, the actuator 220 can cause fluid to flow only through the radiator 240 and the chiller 255 (e.g., out of the radiator 240, the heater 250, and the chiller 255). In the second mode of operation, the apparatus 200 can facilitate cooling the fluid, for example.

The method 1100 can include at least partially inhibiting fluid from the heater 250 and the radiator 240, as depicted at act 1120. For example, when the third mode of operation is selected, the processor 415 can cause the actuator 220 to at least partially close the second opening 290 and the third opening 295 of the actuator 220 such that the actuator 220 at least partially bypasses the radiator 240 and the heater 250 (e.g., at least partially blocks (e.g., occludes) fluid from flowing through the radiator 240 and the heater 250). In the third mode of operation, for example, the actuator 220 can cause fluid to flow only through the chiller 255 (e.g., out of the radiator 240, the heater 250, and the chiller 255). In the third mode of operation, the apparatus 200 can facilitate significantly cooling the fluid, for example.

The method 1100 can include at least partially inhibiting fluid from the radiator 240 and the chiller 255, as depicted at act 1125. For example, when the fourth mode of operation is selected, the processor 415 can cause the actuator 220 to at least partially close the first opening 285 and the third opening 295 of the actuator 220 such that the actuator 220 at least partially bypasses the radiator 240 and the chiller 255 (e.g., at least partially blocks (e.g., occludes) fluid from flowing through the radiator 240 and the chiller 255). In the fourth mode of operation, for example, the actuator 220 can cause fluid to flow only through the heater 250 (e.g., out of the radiator 240, the heater 250, and the chiller 255). In the fourth mode of operation, the apparatus 200 can facilitate significantly warming the fluid, for example.

Figure 12:
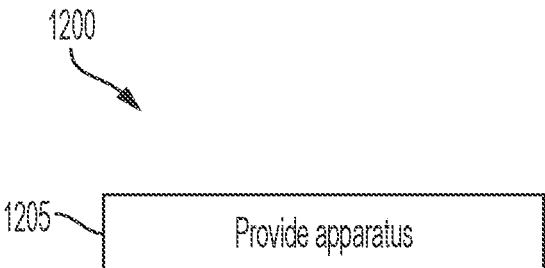
FIG. 12 depicts an example illustration of a process, in accordance with implementations.

FIG. 12 depicts an example method 1200. The method 1200 can include providing the apparatus 200 of the battery system 103, as depicted at act 1205. For example, the apparatus 200 can include the actuator 220 having the plurality of openings (e.g., first opening 285, second opening 290, third opening 295, fourth opening 297) each coupled with a respective fluid channel (e.g., pipe, conduit, or other device in which fluid can flow through). At least one of the fluid channels can couple with the battery module 205 or the PEM 265 such that the actuator 220 can facilitate controlling fluid flow through a portion of the battery module 205 or the PEM 265 (e.g., through one or more fluid channels or to a cold plate disposed within a portion of an enclosure of the battery module 205 or an enclosure of the PEM 265).

The actuator 220 can communicably couple with the data processing system 405 that can control the actuator 220. For example, the data processing system 405 (e.g., the processor 415) can receive one or more signals or parameters from one or more sensors coupled with the battery system 103. The data processing system 405 can determine a temperature (or other characteristic) of the battery system 103 based on the received parameter or signal. The data processing system 405 can determine a required state of operation based on the received parameter or signal. The data processing system 405 can transmit a control signal to the actuator 220 based on the determination to cause the actuator 220 to activate the selected state of operation. As another example, the actuator 220 can change or maintain a state of operation based on a manual input to the actuator 220 or to another component of the system 100. The actuator 220 can change or maintain a state of operation based on a user input to the data processing system 405, as another example.

The actuator 220 can at least partially block (e.g., occlude) the first opening 285 and the second opening 290 when the first mode of operation is selected. For example, the actuator 220 can cause the fluid to at least partially bypass the chiller 255 and the heater 250 in the first mode of operation such that the fluid is primarily cooled by passing through the radiator 240. The actuator 220 can select the first mode of operation when the battery system 103 is at a generally mild ambient temperature (e.g., 20-25° C.), for example.

The actuator 220 can at least partially block (e.g., occlude) the second opening 290 when the second mode of operation is selected. For example, the actuator 220 can cause the fluid to at least partially bypass the heater 250 in the second mode of operation such that the fluid is primarily cooled by passing through the radiator 240 and the chiller 255. The actuator 220 can select the second mode of operation when the battery system 103 is at a generally warm ambient temperature (e.g., 25-35° C.), for example.

The actuator 220 can at least partially block (e.g., occlude) the second opening 290 and the third opening 295 when the third mode of operation is selected. For example, the actuator 220 can cause the fluid to at least partially bypass the radiator 240 and the heater 250 in the third mode of operation such that the fluid is primarily cooled by passing through the chiller 255. The actuator 220 can select the third mode of operation when the battery system 103 is at a generally hot ambient temperature (e.g., greater than 35° C.), for example.

The actuator 220 can at least partially block (e.g., occlude) the first opening 285 and the third opening 295 when the fourth mode of operation is selected. For example, the actuator 220 can cause the fluid to at least partially bypass the radiator 240 and the chiller 255 in the fourth mode of operation such that the fluid is primarily heated by passing through the heater 250. The actuator 220 can select the fourth mode of operation when the battery system 103 is at a generally cool ambient temperature (e.g., less than 0° C.), for example.

Figure 13:
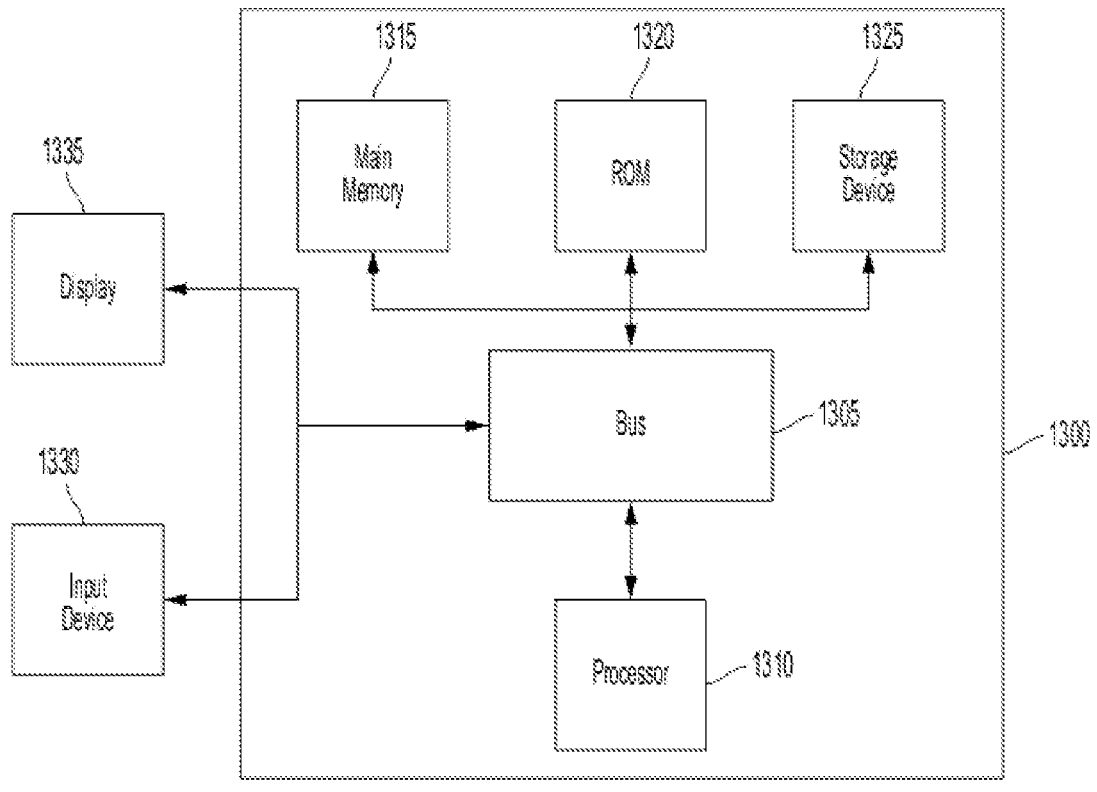
FIG. 13 is a block diagram illustrating an architecture for a computer system that can be employed to implement elements of the systems and methods described and illustrated herein.

FIG. 13 depicts an example block diagram of an example computer system 1300. The computer system or computing device 1300 can include or be used to implement the data processing system 405 or its components. The computing system 1300 includes at least one bus 1305 or other communication component for communicating information and at least one processor 1310 or processing circuit coupled to the bus 1305 for processing information. The computing system 1300 can also include one or more processors 1310 or processing circuits coupled to the bus for processing information. The computing system 1300 also includes at least one main memory 1315, such as a random access memory (RAM) or other dynamic storage device, coupled to the bus 1305 for storing information, and instructions to be executed by the processor 1310. The main memory 1315 can be used for storing information during execution of instructions by the processor 1310. The computing system 1300 may further include at least one read only memory (ROM) 1320 or other static storage device coupled to the bus 1305 for storing static information and instructions for the processor 1310. A storage device 1325, such as a solid state device, magnetic disk or optical disk, can be coupled to the bus 1305 to persistently store information and instructions.

The computing system 1300 may be coupled via the bus 1305 to a display 1335, such as a liquid crystal display, or active matrix display, for displaying information to a user such as a user of the data processing system 405 or another end user. An input device 1330, such as a keyboard or voice interface may be coupled to the bus 1305 for communicating information and commands to the processor 1310. The input device 1330 can include a touch screen display 1335. The input device 1330 can also include a cursor control, such as a mouse, a trackball, or cursor direction keys, for communicating direction information and command selections to the processor 1310 and for controlling cursor movement on the display 1335.

The processes, systems and methods described herein can be implemented by the computing system 1300 in response to the processor 1310 executing an arrangement of instructions contained in main memory 1315. Such instructions can be read into main memory 1315 from another computer-readable medium, such as the storage device 1325. Execution of the arrangement of instructions contained in main memory 1315 causes the computing system 1300 to perform the illustrative processes described herein. One or more processors in a multi-processing arrangement may also be employed to execute the instructions contained in main memory 1315. Hard-wired circuitry can be used in place of or in combination with software instructions together with the systems and methods described herein. Systems and methods described herein are not limited to any specific combination of hardware circuitry and software.

Although an example computing system has been described in FIG. 13, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture.

The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one imple- mentation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure. For example, the apparatus 200 can be used in a variety of other systems that require thermal management via one or more fluid channels. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a battery system comprising a housing, the housing comprising one or more sensors configured to detect an ambient temperature and an actuator having a plurality of openings, each of the plurality of openings coupled with a respective fluid channel, each of the respective fluid channels coupled with a battery module;
the actuator configured to select, based on the detected ambient temperature, one of the fluid channels to control fluid distribution through the plurality of openings and through each fluid channel to regulate a temperature of the battery module;
wherein the battery system is coupled to a control hub, and wherein the control hub is separately connectable to an electric vehicle such that the control hub is configured to control electricity flow between the electric vehicle, the battery system, and an external power source;
the actuator configured to at least partially block fluid from flowing through a heater and a chiller in a first selection of the fluid channels responsive to the detected ambient temperature being within a first range;
the actuator configured to at least partially block fluid from flowing through the heater in a second selection of the fluid channels responsive to the detected ambient temperature being within a second range that is distinct from the first range;
the actuator configured to at least partially block fluid from flowing through the heater and a radiator in a third selection of the fluid channels responsive to the detected ambient temperature being within a third range that is distinct from each of the first range and the second range; and
the actuator configured to at least partially block fluid from flowing through the radiator and the chiller in a fourth selection of the fluid channels responsive to the detected ambient temperature being within a fourth range that is distinct from the third range.

2. The system of claim 1, comprising:
a first fluid channel of the fluid channels fluidly coupled with the actuator;

a second fluid channel of the fluid channels coupled with a cold plate disposed within a portion of the battery module; and
the first fluid channel is configured to be in in fluid communication with the second fluid channel.

3. The system of claim 1, comprising:
a portion of the actuator moves from a first position to a second position to select the one of the fluid channels.

4. The system of claim 1, comprising:
the actuator configured to at least partially block a first opening and a second opening of the plurality of openings in the first selection of the fluid channels;
the actuator configured to at least partially block the second opening of the plurality of openings in the second selection of the fluid channels;
the actuator configured to at least partially block the second opening and a third opening of the plurality of openings in the third selection of the fluid channels; and
the actuator configured to at least partially block the first opening and the third opening of the plurality of openings in the fourth selection of the fluid channels.

5. The system of claim 1, comprising:
a second actuator coupled with a power electronic module, the second actuator having an opening coupled with at least one of the fluid channels; and
the second actuator configured to close the opening to control fluid distribution through the opening to regulate the power electronic module.

6. The system of claim 1, comprising:
the external power source includes a renewable energy source.

7. The system of claim 1, comprising:
the control hub includes a bi-directional inverter.

8. The system of claim 1, comprising:
the housing of the battery system configured to be coupled to an internal area of a building.

9. The system of claim 1, comprising:
the housing of the battery system configured to be coupled to an external area of a building.

10. The system of claim 1, comprising:
the first range of ambient temperature is lower than the second range.

11. The system of claim 1, comprising:
a second actuator coupled with a power electronic module, the second actuator having an opening coupled with at least one of the fluid channels; and
the second actuator configured to close the opening responsive to receiving a user input to a portion of the system.

12. The system of claim 1, comprising:
a fan coupled with the housing, the fan to circulate air from an ambient surrounding through the housing.

13. The system of claim 1, comprising:
the plurality of openings configured to fluidly couple with a compressor, an expansion valve, a pump, and a reservoir; and
each of the compressor, the expansion valve, the pump, and the reservoir configured to further facilitate controlling the fluid distribution of the fluid channels.

* * * * *